United States Patent
Hwang et al.

(10) Patent No.: US 12,276,029 B2
(45) Date of Patent: Apr. 15, 2025

(54) METALLIC PARTICLE-DEPOSITION SUBSTRATE, METHOD AND APPLICATION THEREOF FOR INCREASING HETEROINTERFACE

(71) Applicant: National Taiwan University of Science and Technology, Taipei (TW)

(72) Inventors: Bing-Joe Hwang, Taipei (TW); Wei-Nien Su, Taipei (TW); Meng-Che Tsai, Taipei (TW); Sheng-Chiang Yang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 255 days.

(21) Appl. No.: 17/741,642

(22) Filed: May 11, 2022

(65) Prior Publication Data

US 2023/0095521 A1    Mar. 30, 2023

(30) Foreign Application Priority Data

Sep. 28, 2021 (CN) .......................... 202111141367.1
Sep. 28, 2021 (TW) ................................ 110136025

(51) Int. Cl.
*C23C 2/04* (2006.01)
(52) U.S. Cl.
CPC ..................................... *C23C 2/04* (2013.01)

(58) Field of Classification Search
CPC ........ B05D 1/18; B05D 7/14; B05D 2202/00; B05D 2401/20; B05D 2601/28; C23C 2/04; C23C 18/44; C23C 18/54; C23C 30/00; G01N 21/658
See application file for complete search history.

(56) References Cited

U.S. PATENT DOCUMENTS

2021/0130973 A1* 5/2021 Lu .............................. C25F 3/02

* cited by examiner

*Primary Examiner* — Hai Y Zhang
(74) *Attorney, Agent, or Firm* — Best & Flanagan LLP

(57) ABSTRACT

Present invention is related to a metallic particle-deposition substrate having a metal substrate and multiple metallic particles attached thereon. The metallic particles are nano-particles with at least 90% of these nano-particles as single layer being evenly dispersed on the metal substrate. Each of the metallic particle is isolated without toughing or overlapping. The metal substrate has different material than the metallic particles in each preferred embodiment in the present invention. More preferably, at least 80% of the metallic particles have the distance between each metallic particle is at a range of 2-6 nm for better generation of hotspot effects. The present invention provides a fast production method for producing the substrate with heterogeneous interface. The metallic particles are evenly attached to the surface of the metal substrate to obtain better surface enhanced Raman effect as to apply for sensors in all kinds of field.

5 Claims, 9 Drawing Sheets

METALLIC PARTICLE-DEPOSITION SUBSTRATE, METHOD AND APPLICATION THEREOF FOR INCREASING HETEROINTERFACE

FIELD OF INVENTION

The present invention is related to a metallic particle-deposition substrate, especially to the deposited particles and the substrate using different metallic materials to have heterointerface and production method and application thereof.

The metallic particle-deposition substrate provided by the present invention is primarily applied on an application for serving surface-enhanced Raman effect, and this application will be mainly illustrated with corresponded figures and described hereinafter. It is appreciated that this certain application and the production method are not limited by the present invention. Other same or equivalent applications should be considered claimed or protected within a scope of the present invention.

BACKGROUND OF THE INVENTION

Surface-enhanced Raman effect (SERS) can be used in the detection of target molecules or their derivatives and metabolites (also known as Label-free detection).

However, some common problems of the detection using SERS technique are Raman signal instability, low sensitivity and unreliability. These problems often occur to the detection device using silicon substrate which the signal instability are predicted even on the same substrate but just simply different position thereon. Hence, It is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to improve the conventional detection using SERS but troubles with Raman signal instability and low sensitivity problems, the present invention provides a metallic particle-deposition substrate with heterointerface comprises: a metal substrate and multiple metallic particles attached or deposited on a surface of the metal substrate; the metallic particles are nanoparticles; at least 50% of the metallic particles not contact or overlap, and are attached to at least 50% of the surface of the metal substrate in a condition with at least single particulate layer; a material of the substrate is metal and is different from a metallic material of the metallic particles; and at least 50% of the metallic particles have each particle in a distance at a range of 0.5-100 nm.

In accordance, another aspect of the present invention provides a production method for producing a metallic particle-deposition substrate comprising steps as followings:

S1) providing an immersion solution, the immersion solution is an aqueous solution containing a concentration at a range of 0.01 mM~100 mM of hydroquinone and a concentration at a range of 0.01 mM~100 mM of metallic ion;

S2) in-situ polymerizing a metallic particle on a surface of a metal substrate after immersing a raw metal substrate in the immersion solution; wherein: the metal substrate and multiple metallic particles attached or deposited on the surface of the metal substrate; the metallic particles are nanoparticles; at least 50% of the metallic particles not contact or overlap, and are attached to at least 50% of the surface of the metal substrate in a condition with at least single particulate layer; a material of the substrate is metal and is different from a metallic material of the metallic particles; and at least 50% of the metallic particles have each particle in a distance at a range of 0.5~100 nm.

In accordance, the present invention has the following advantages:

1. The present invention provides a rapid and efficient production method to produce a metallic substrate with heterogeneous metallic particles attached thereof. The metallic substrate of the present invention has high and even metallic particle coverage with extraordinary hydrophobicity (or lotus effect). The heterogeneous interface between the metallic substrate and the particle could be widely used in sensor and relative filed.

The critical feature of the present invention is to synthesize the metallic particles on the surface of the metallic substrate with an even and efficient distance to increase a surface plasmon resonance effect (LSPR) at the heterogeneous interface. Huge amount of hot spots are evenly generated and distributed at the heterogeneous interface producing a consistent Surface Enhanced Raman Effect. The metallic substrate has extraordinary hydrophobicity (or lotus effect) for allowing any test substances attached firmly.

The present invention uses a fast chemical in-situ synthesis method to deposit the metallic particle evenly on the surface of the metallic substrate. This method could be performed within an extremely short period of time and had the particle size and the distribution of the metallic particles to be highly even. The present invention has excellent surface enhanced Raman scattering signals and is highly sensitive for testing S. Aureus and V. Parahaemolyticus virus as sensor applications.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1A:
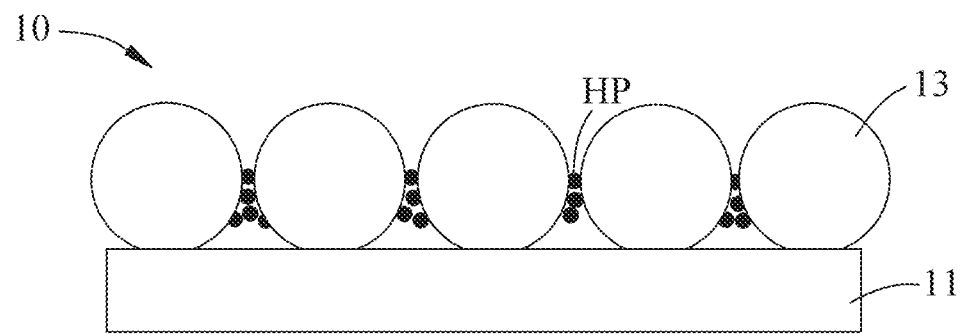
FIGS. 1A and 1B are illustrations of the first and second preferred embodiments of a metallic particle-deposition substrate in accordance with the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. To facilitate of understanding and reading the present invention, all the following process of synthesis of this novel ketone-containing alicyclic dianhydrides will be described in sequence. However, it should be understandable yet more reasonable that the process of synthesis provided below is only preferable embodiments. Other reasonable adjustments in the same or similar process or steps shall be covered by the present invention.

Preferred Embodiment 1 of Metallic Particle-Deposition Substrate

With reference to FIG. 1A, a preferred embodiment of the metallic particle-deposition substrate 10 of the present invention comprises a metal substrate 11 and multiple metallic particles 13 attached or deposited on a surface of the metal substrate 11. The metallic particles 13 in the present invention are nanoparticles which more preferably at least 50%, or more preferably 50%~90%, or most preferably 70%~95% of the metallic particles 13 have proper distance and do not contact or overlap to each other. The said metallic particles 13 also are attached to at least 50% or more preferably at least 70% of the surface of the metal substrate 11 in a condition with at least a single particulate layer. A suitable but not limited metallic material of the substrate 11 is preferred to be different from a metallic material of the metallic particles 13 in this embodiment of the present invention. It is preferred that at least 50% or more preferably at least 80% of the metallic particles 13 have a distance of 0.5 nm~100 nm or more preferably 0.5 nm~50 nm between each individual particle. An average particle size at a range of 20~85 nm. More preferably, at least 50% or more preferably at least 80% of the metallic particles 13 having the particle size at a range of 40 nm~60 nm.

In this preferred embodiment, the metal substrate 11 may contain copper, such as copper foil. More preferably, the metal substrate 11 may be but not limited to any metallic material including aluminum, zinc, chromium, iron, nickel, or tin. The metallic particles 13 otherwise may be but not limited to silver nano metallic particles, gold nano metallic particles or platinum nano metallic particles.

Preferred Embodiment 2 of Metallic Particle-Deposition Substrate

Figure 1B:
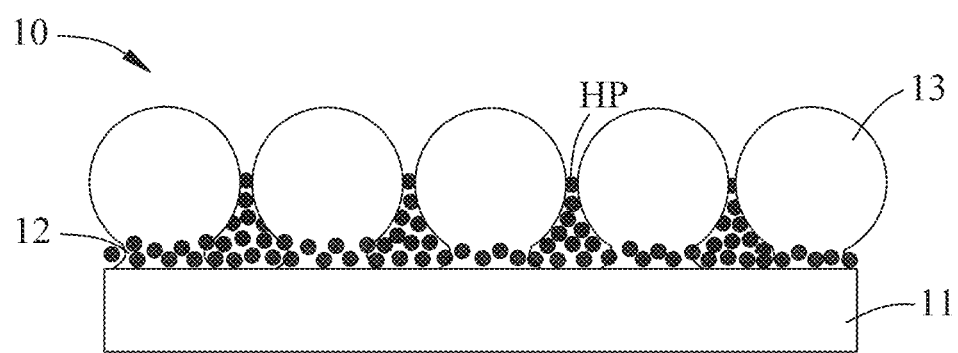

With reference to FIG. 1B, a second preferred embodiment of the metallic particle-deposition substrate 10 of the present invention is basically the same as the aforementioned embodiment 1, except that the metal substrate 11 and the metallic particles 13 further form an alloy layer 12 at its interface as shown in corresponded figure. The alloy layer 12 is an alloy formed by the metal material from the metal substrate 11 and the metal material of the metallic particles 13. A thickness of the alloy layer 12 is preferably less than 50 nm.

Preferred Embodiment 3 of Metallic Particle-Deposition Substrate

The third preferred embodiment of the metallic particle-deposition substrate 10 of the present invention combines the distance and distribution condition between the metallic particles 13 and the metallic particles 13 in embodiment 1 and also includes the alloy layer 12 formed between the metal substrate 11 and the metallic particles 13 in embodiment 2 to have the metallic particle-deposition substrate 10.

Figure 2:
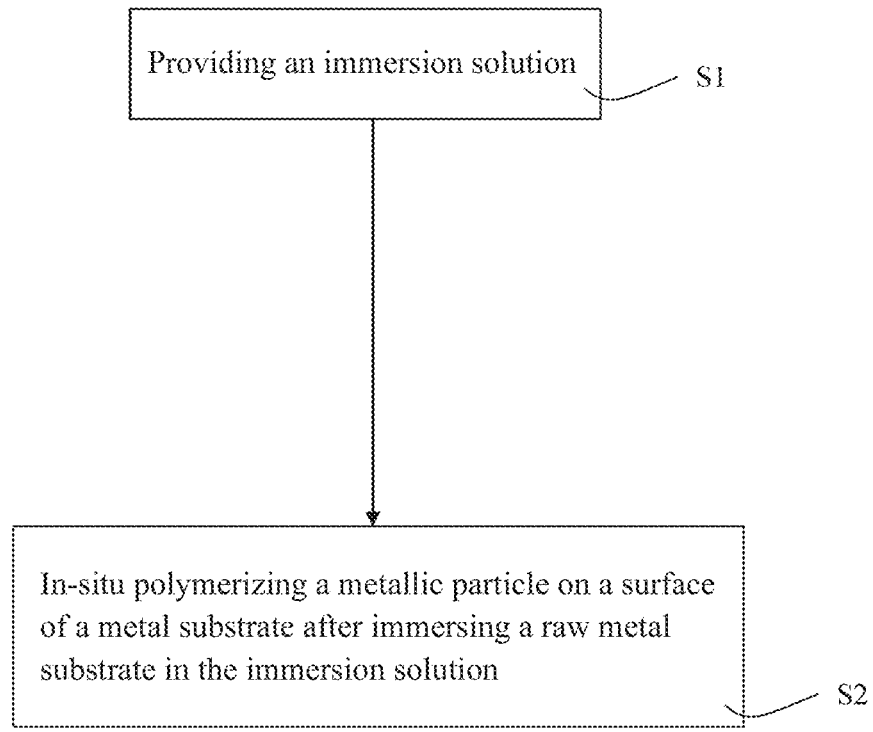
FIG. 2 is an illustration or a flow chart of a preferred embodiment of a production method for producing a metallic particle-deposition substrate in accordance with the present invention.

Preferred Embodiment of Production Method for Metallic Particle-Deposition Substrate With reference to FIG. 2, the production method for producing the metallic particle-deposition substrate 10 of the present invention comprises steps as followings:

S1) providing an immersion solution, the immersion solution is an aqueous solution containing a concentration at a range of 0.01 mM~100 mM of hydroquinone and a concentration at a range of 0.01 mM~100 mM of metallic ions, such as silver, gold or platinum ion. It is worth to be noticed that the hydroquinone is mainly used as a reducing agent in the immersion solution. Also, by the credit to the silver or copper metal nanoparticles has a moderate reduction potential characteristic. The alloy layer 12 is able to be formed with such chosen materials having suitable oxidation and reduction abilities in a fast in-situ polymerization on the surface of the metal substrate 11.

S2) in-situ polymerizing the metallic particle 13 on the surface of the metal substrate 11 after immersing the cleaned metal substrate 11 in the immersion solution. Further by optional washing and drying steps, the metallic particle-deposition substrate 10 of the present invention could be successfully obtained. In this preferred embodiment, the silver nanoparticles can be attached or deposited to the metal substrate 11 by immersing in a silver nitrate solution with 0.01 mM~100 mM of hydroquinone and 0.01 mM~100 mM of silver ions as the immersion solution described above.

The in-situ polymerization step time as mentioned in step S2 in this embodiment only needs to be less than or about 3 minutes to achieve the required size, size and uniform distribution of the metallic particles 11 provided the present invention.

The production method of the present invention could be considered as the Chemical Plating method. By simply immersing the substrate in a suitable solution, the target metallic particles will be deposited within a short period of time. This could benefit to apply any substrate with different, uneven or irregular surface conditions. Also, by adjusting the concentration of the immerse solution, the reaction time, the thickness, the size of the deposited object could be easily adjusted as desired.

<Qualitative Tests>

Figure 3A:
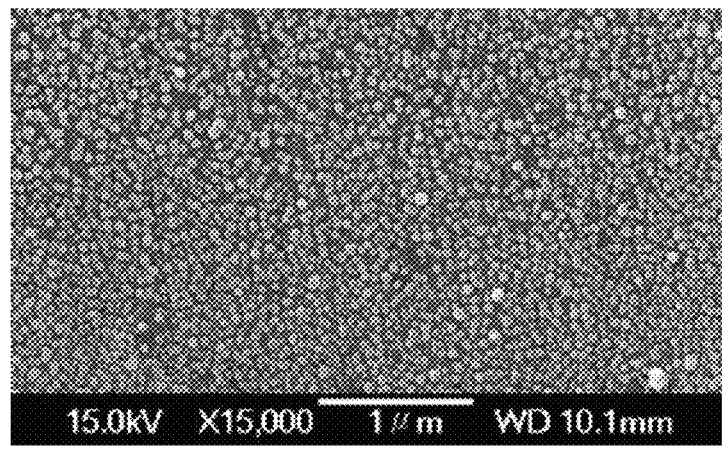
FIGS. 3A and 3B are SEM images of a second preferred embodiment in accordance with the present invention.
Figure 3A:
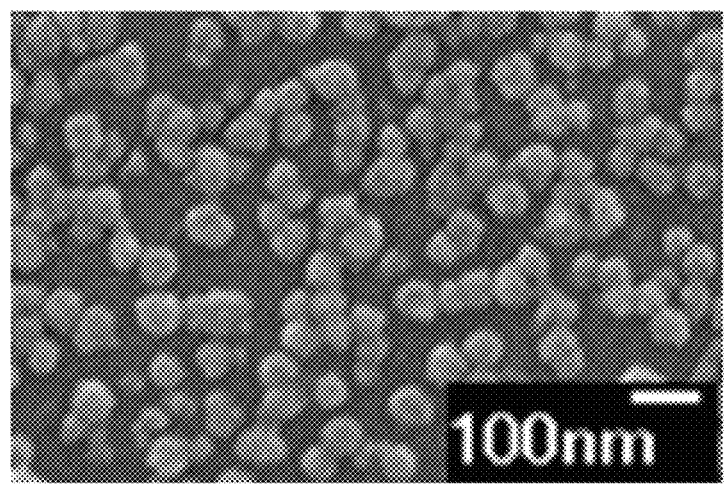
Figure 3B:
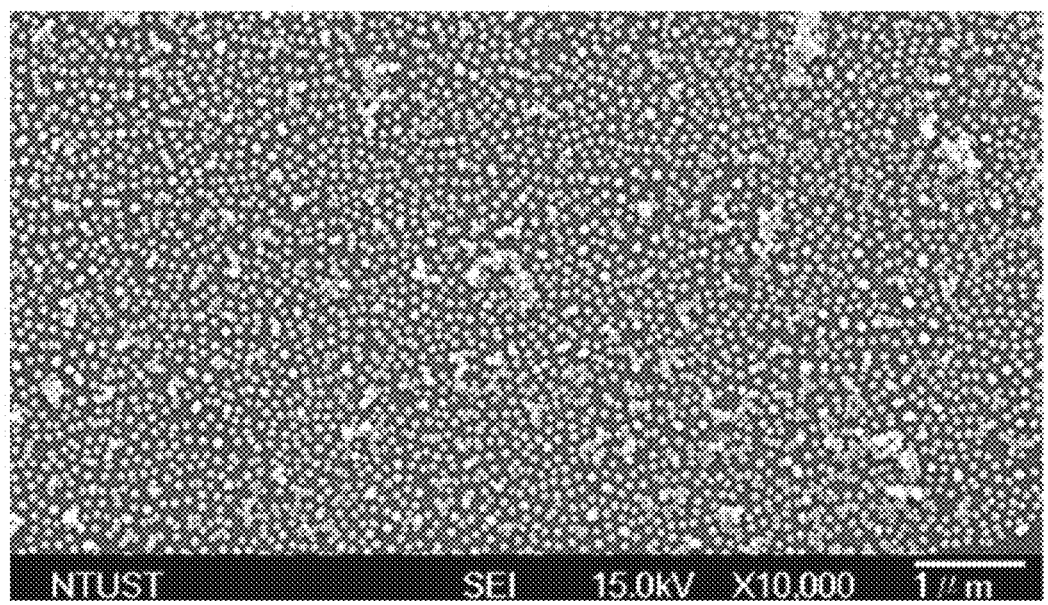
Figure 3C:
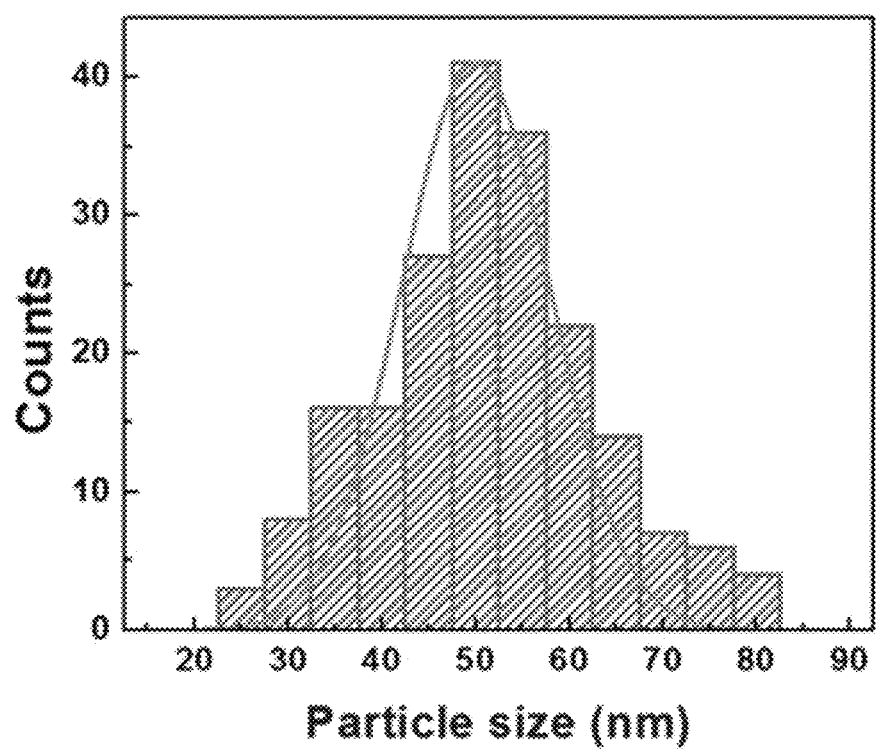
FIG. 3C is a bar graph of Chart the particle size of a preferred embodiment in accordance with the present invention.

With reference to FIGS. 3A and 3B, two electron microscope images (SEM) of the aforementioned metallic particle-deposition substrate 10 of the present invention are shown with copper foil deposited with the silver nanoparticles, and aluminum foil deposited with the gold nanoparticles. With reference to these figures and also accomplished and estimated by suitable scanning software analysis, the results show that more than 90% of the metallic particles 13 in FIG. 3A are not in contact or overlapping with each other. The particle size of the metallic particles 13 is even size, and the distribution is uniform. The metallic particles 13 cover at least more than 70% of the surface area of the metal substrate 11. In FIG. 3B, an SEM image of the embodiment of the aluminum foil substrate attached with the gold nanoparticles also shows the same or equal uniform distribution. FIG. 3C shows the particle size distribution of the metallic particles 13 demonstrating that the average particle size of the metallic particles 13 is at the range of 20-85 nm, and at least 80% of the metallic particles 13 have a particle size of 50 nm. FIGS. 3A to 3C show that the metallic particles 13 of the present invention can be obtained with highly uniform distribution on the metal substrate 11 through the aforementioned low cost and fast production method.

<Validation Tests>

Next, the metallic particle-deposition substrate 10 obtained from copper foil and silver nanoparticles is fabricated as a Raman scattering test specimen.

Figure 4:
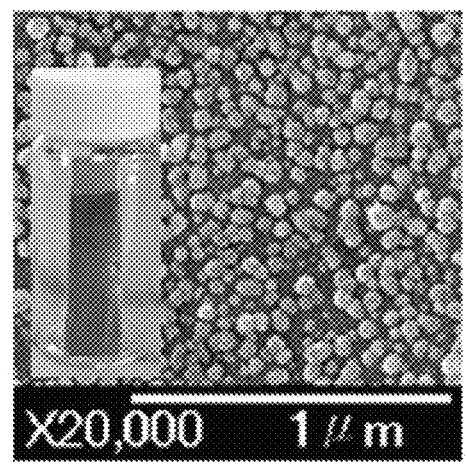
FIG. 4 is a Raman dispersion spectrum of a preferred embodiment in accordance with the present invention.
Figure 4:
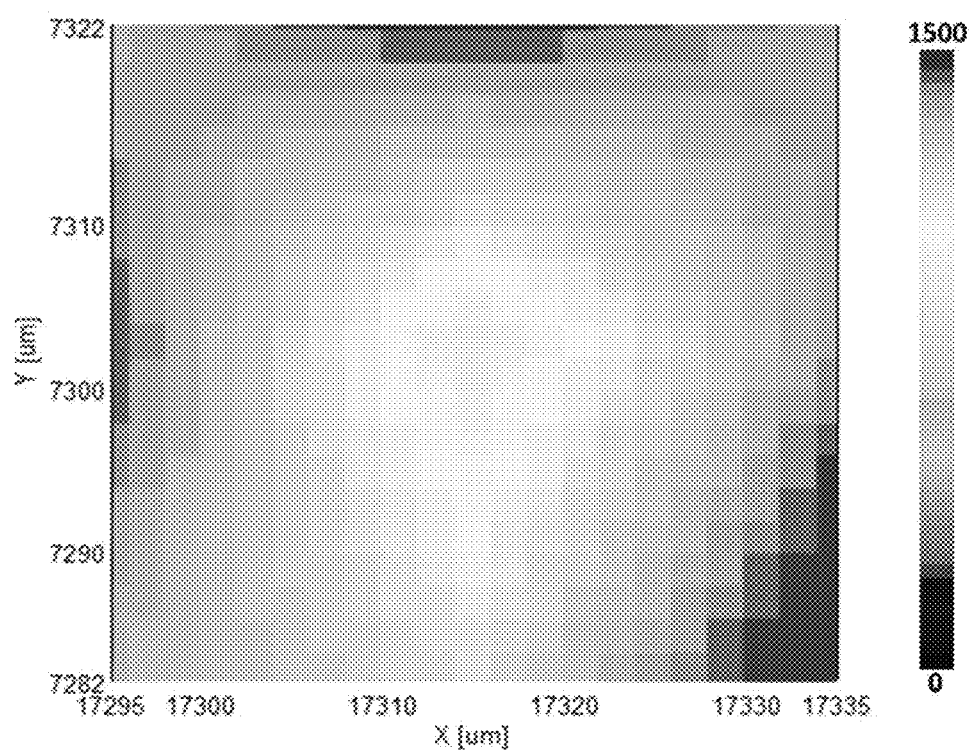

Please refer to the Raman dispersion spectroscopy (SERS mapping) shown in FIG. 4, the SERS mapping result shows that the metallic particle-deposition substrate 10 with the copper foil and the silver nanoparticles has a strong plasma resonance (LSPR) effect by the high distribution of the silver nanoparticles on the substrate.

Figure 5:
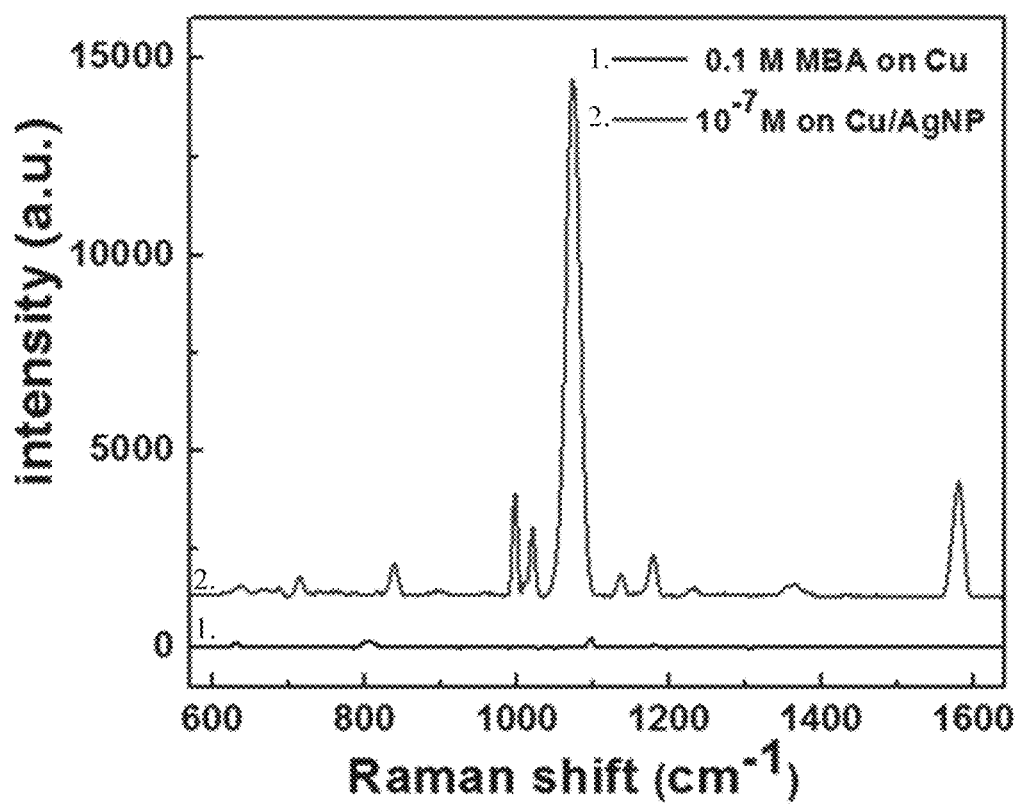
FIGS. 5, 6A, and 6B are Raman enhanced scattering factor figures of several preferred embodiments in accordance with the present invention.

With reference to FIG. 5, a Raman standard sample using Mercaptobenzoic acid (MBA) is used for the test and the SEM images in FIGS. 3A and 3B are also used for conversion reference. Copper foil and silver nanoparticles, aluminum foil and gold nanoparticles are drawn separately with SERS Enhancement factor can be as high as $6.1 \times 10^7$ and $6.4 \times 10^6$.

Figure 6A:
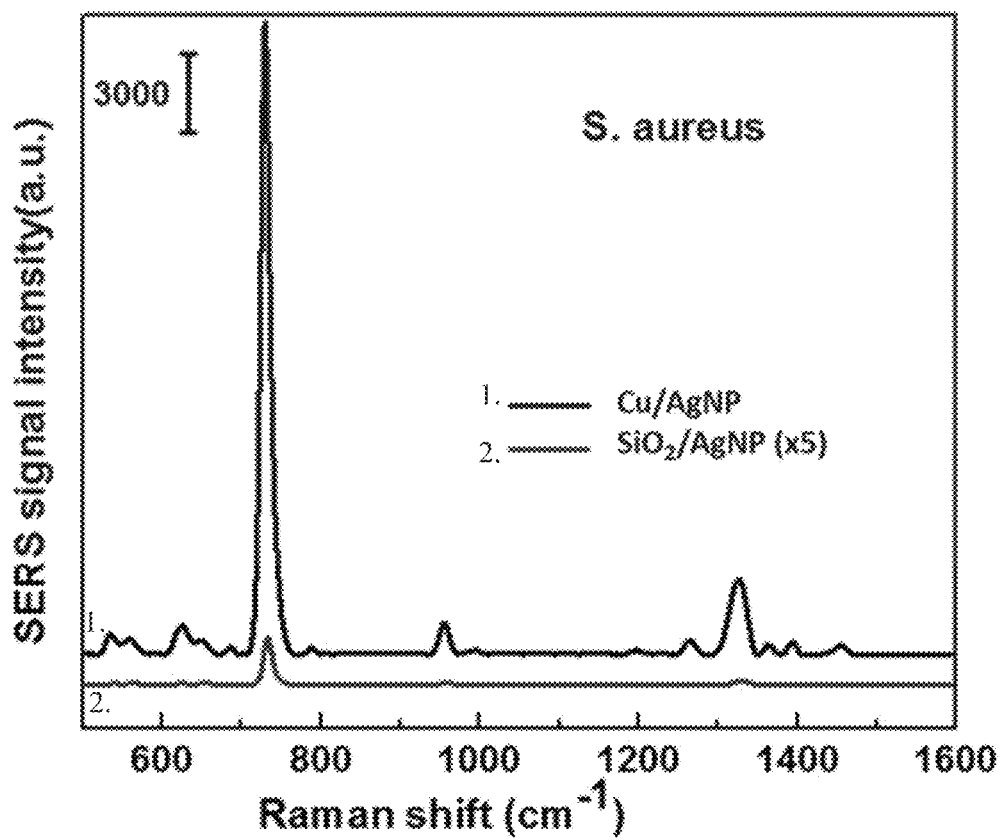
Figure 6B:
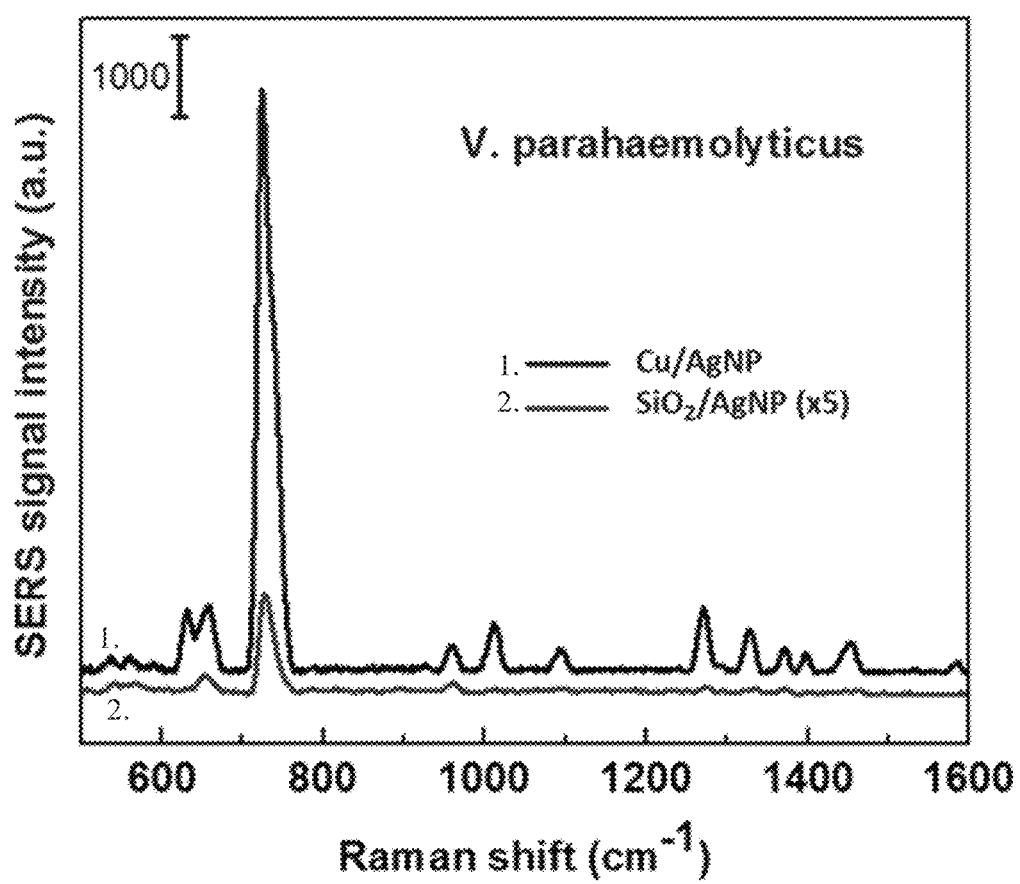

FIGS. 6A and 6B show the aforementioned embodiments as Raman test specimens to test *S. aureus* and *V. parahaemolyticus* respectively. Due to the heterogeneous interface of Cu/AgNP and the high dispersion of silver particles, the signal analysis of the present invention has high sensitivity and recognition. The comparative example on the right side of the figure uses a non-metallic substrate silicon dioxide/silver nanoparticle (SiO$_2$/AgNP) test specimen that the result otherwise shows poor sensitivity and low signal resolution even amplified by 5 times of the signals.

By using hetero-metallic materials of the metal substrate 11 and the metallic particles 13 with highly uniform distribution and also the unique alloy layer 12 formed between the metal substrate 11 and the metallic particles 13, the present invention shows great and strong Raman scattering signal hot spots HP (as shown in FIG. 1) between jointed nanoparticles, and also the interface between the metal substrate 11 and the metallic particles 13, and even the slit area where the substrate without covering the metallic particles which could benefit of enhancement of SERS effect for the detection or sensor applications.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A Raman spectrometry test specimen comprises a metallic particle-deposition substrate, the metallic particle-deposition substrate comprising:

a metal substrate comprising a first metallic material;

a plurality of metallic particles on a surface of the metal substrate in a single particulate layer, the metallic particles are nanoparticles, wherein the metallic particles comprise a second metallic material different from the first metallic material, wherein at least 50% of the metallic particles do not contact or overlap and are attached to at least 50% of the surface of the metal substrate; and an alloy layer at an interface between the metal substrate and the metallic particles, the alloy layer having a thickness less than 50 nm;

wherein a material of the alloy layer is a combination of the first metallic material and the second metallic material; and wherein at least 50% of the metallic particles have each metallic particle in a distance at a range of between 0.5 nm and 100 nm between each individual adjacent metallic particle.

2. The Raman spectrometry test specimen as claimed in claim 1, wherein multiple hotspots generate at a site between adjacent metallic particles.

3. The Raman spectrometry test specimen as claimed in claim 1, wherein multiple hotspots generate at a site between an interface of the metallic particles and the substrate.

4. The Raman spectrometry test specimen as claimed in claim 1, wherein multiple hotspots generate at a slit area where the metal substrate is not covered by any of the metallic particles.

5. The Raman spectrometry test specimen as claimed in claim 1, wherein the first metallic material is selected from the group consisting of copper, aluminum, zinc, chromium, iron, nickel and tin; the second metallic material is selected from the group consisting of silver, gold, and platinum; and an average particle size of the metallic particle is at a range of between 20 nm and 85 nm with at least 50% of the metallic particle have a particle size at a range of between 40 nm and 60 nm.

* * * * *